Nov. 20, 1951 W. J. MacEVOY 2,575,353
APPARATUS FOR TROWELING OR COATING THE
INTERIOR SURFACE OF A CONDUIT
Filed Aug. 7, 1947 6 Sheets-Sheet 3

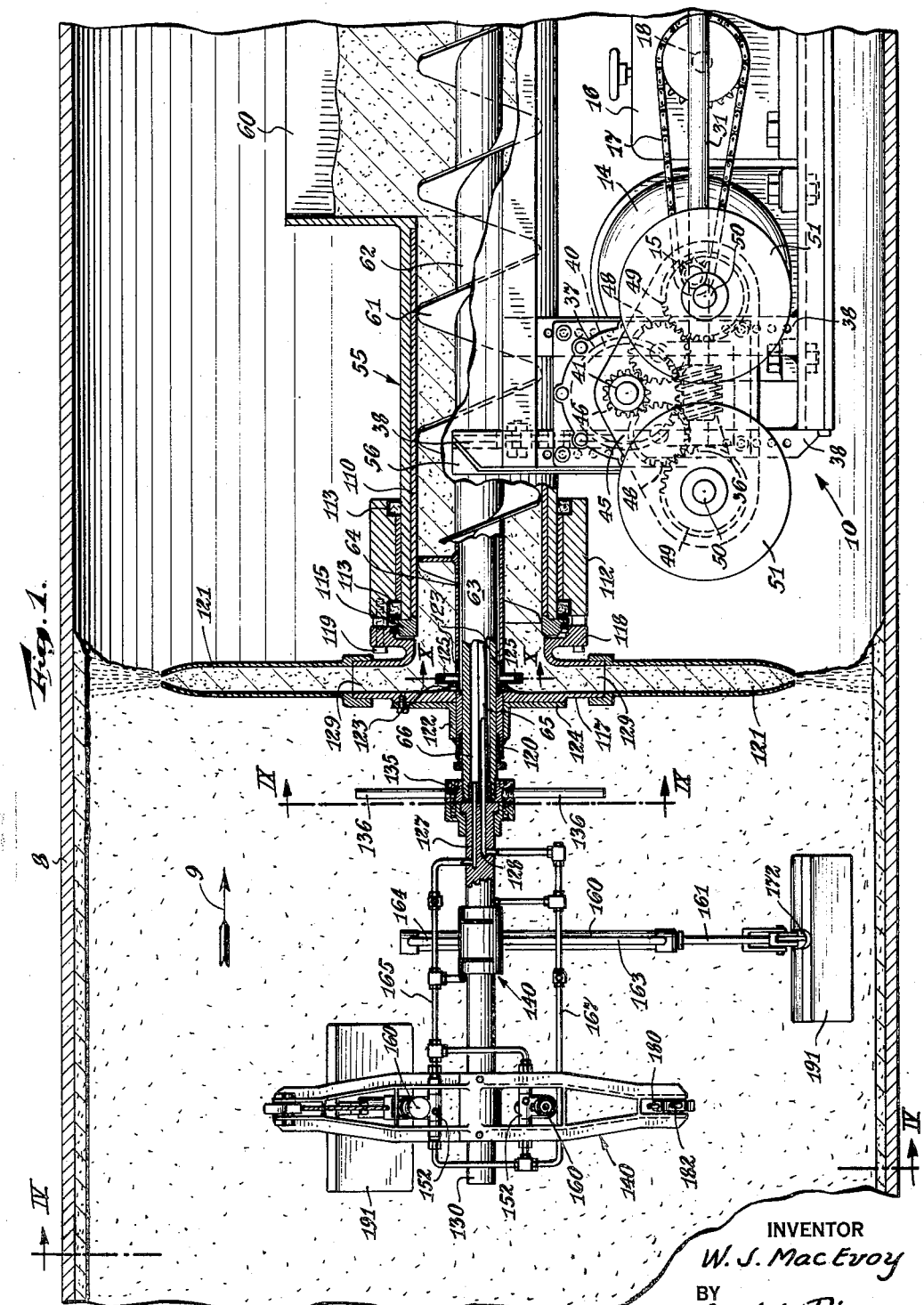

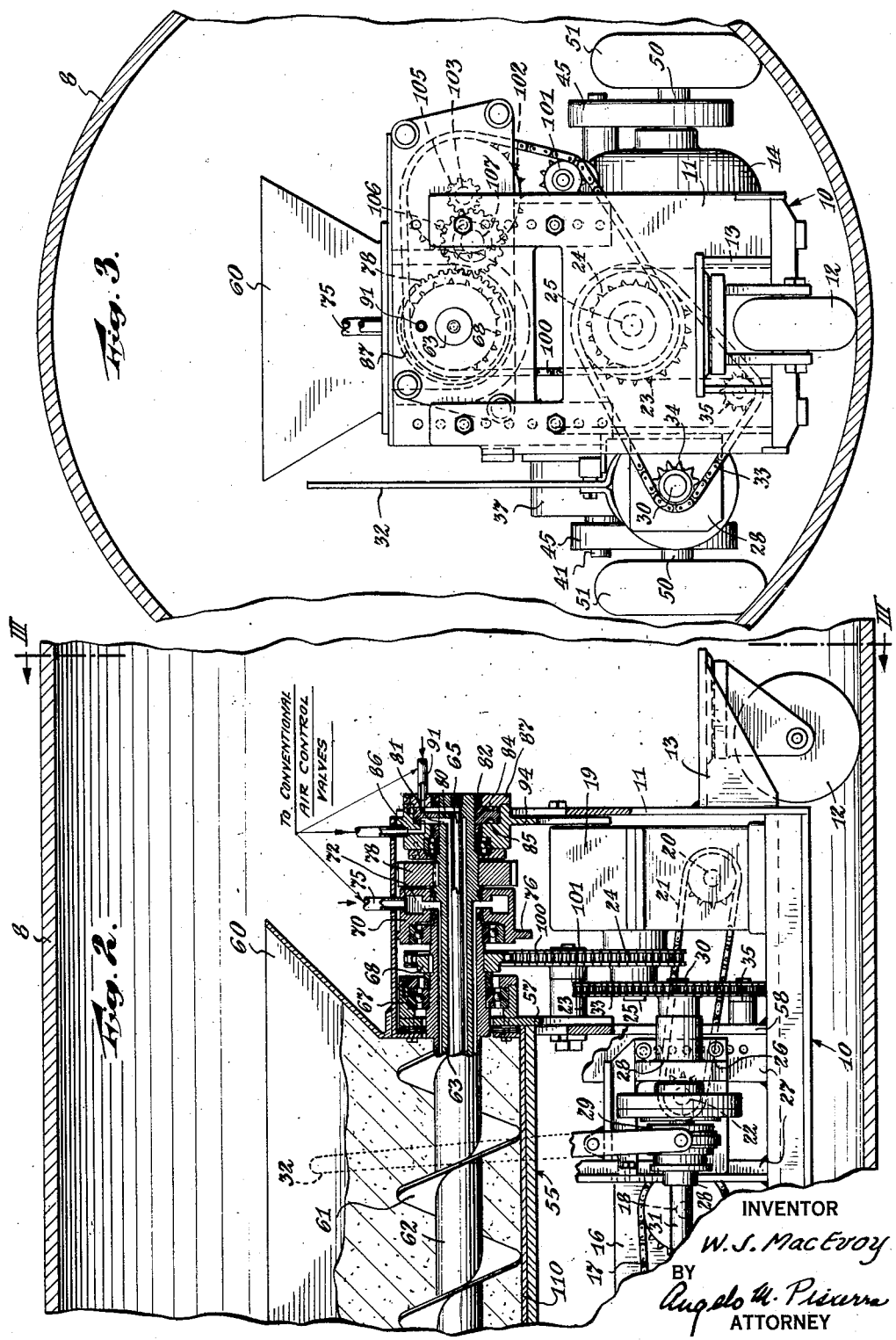

INVENTOR
W. J. MacEvoy
BY
Angelo M. Pisarra
ATTORNEY

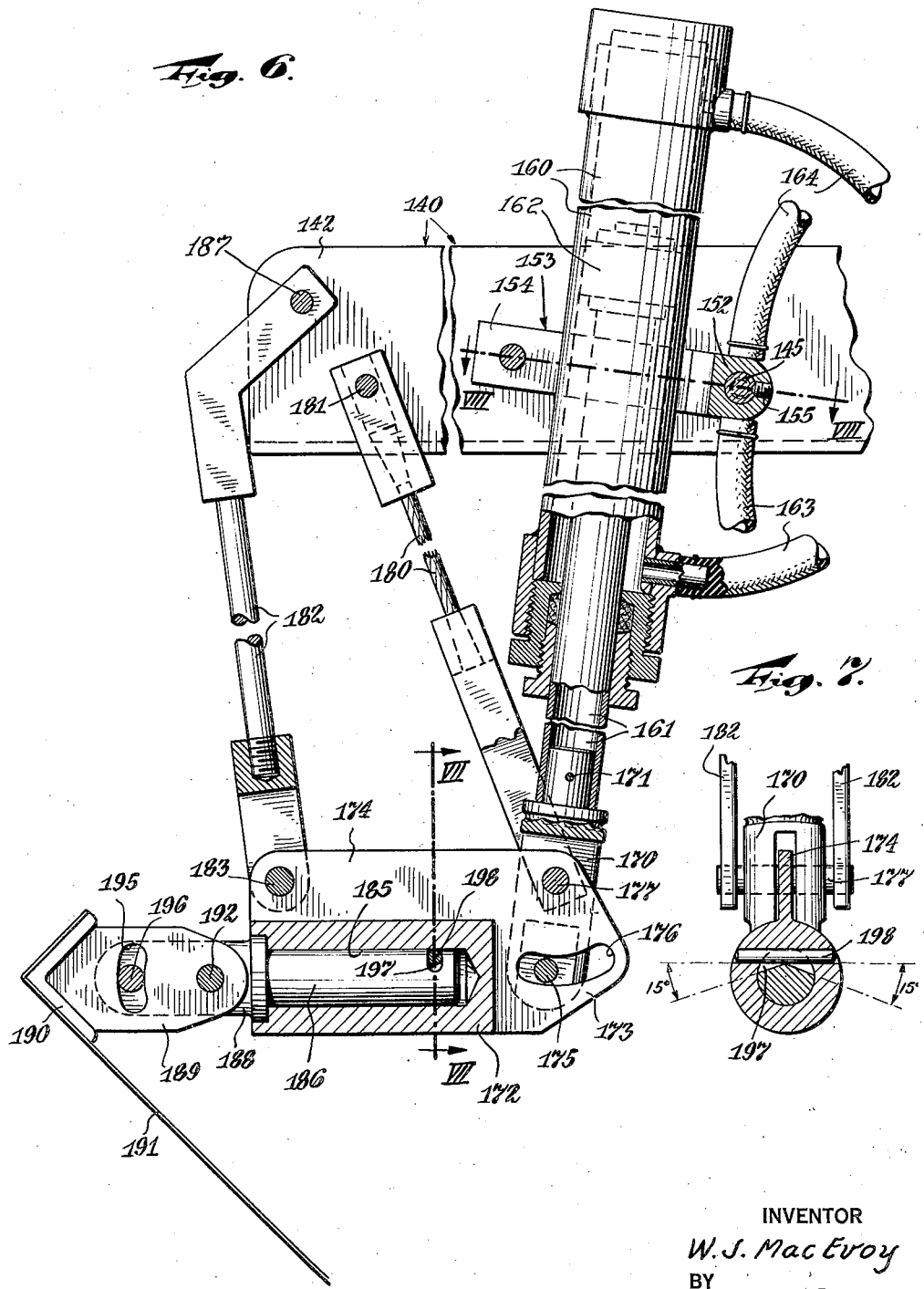

Nov. 20, 1951          W. J. MacEVOY          2,575,353
       APPARATUS FOR TROWELING OR COATING THE
              INTERIOR SURFACE OF A CONDUIT
Filed Aug. 7, 1947                    6 Sheets-Sheet 5
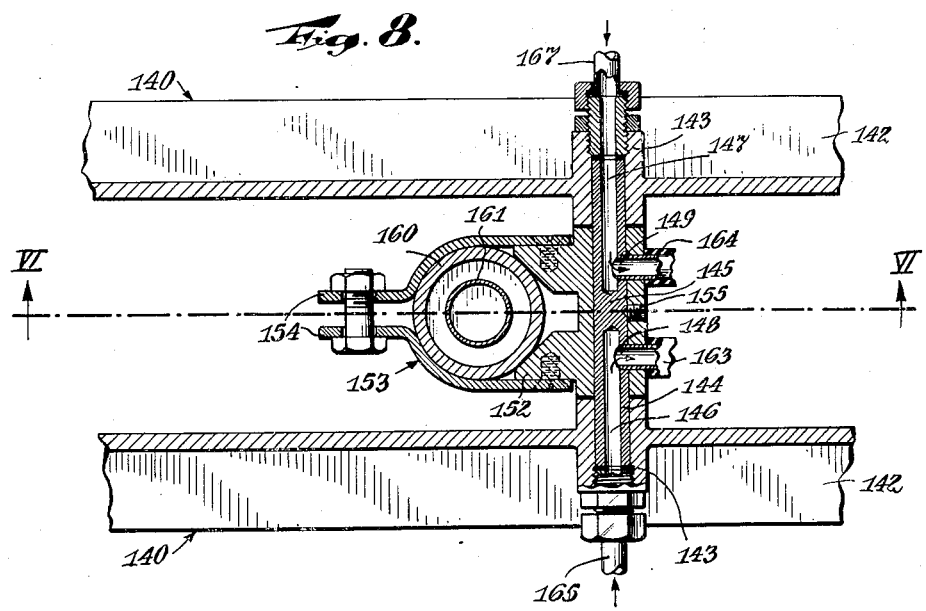
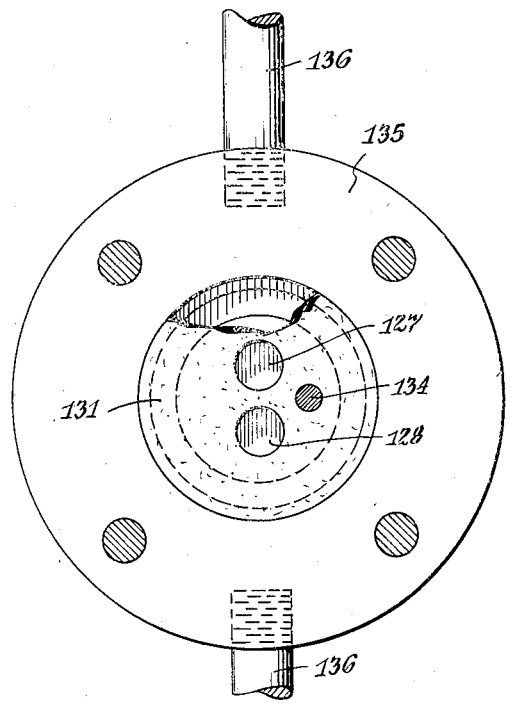
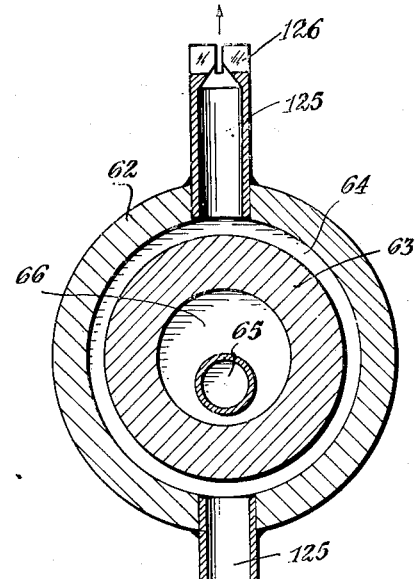
INVENTOR
W. J. MacEvoy
BY
Angelo M. Pisarra
ATTORNEY

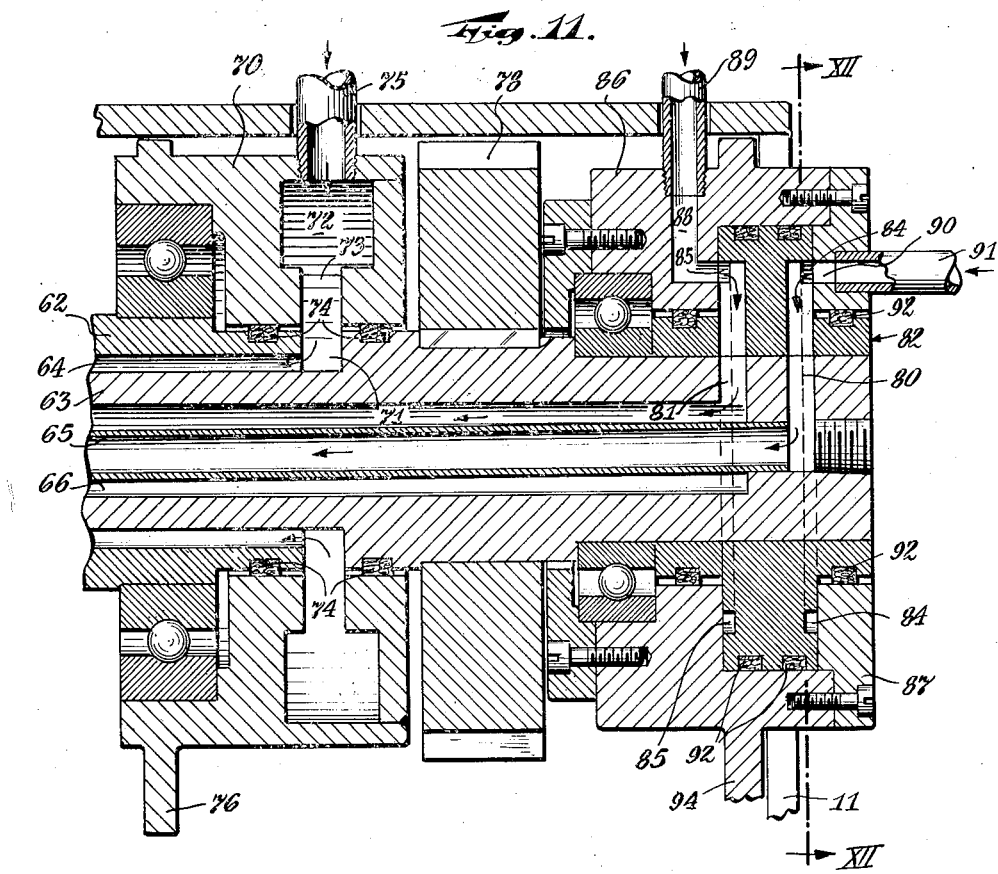
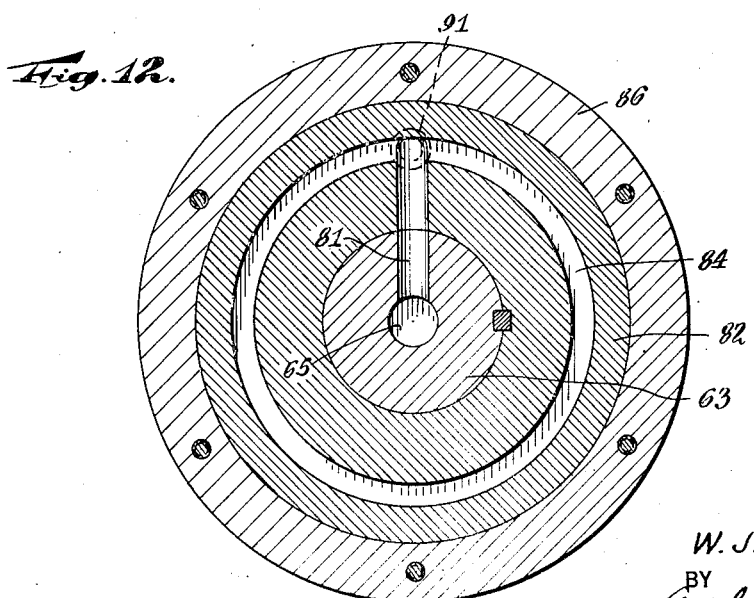

Patented Nov. 20, 1951

2,575,353

UNITED STATES PATENT OFFICE 2,575,353

APPARATUS FOR TROWELING OR COATING THE INTERIOR SURFACE OF A CONDUIT

Warren J. MacEvoy, South Orange, N. J.

Application August 7, 1947, Serial No. 767,264

18 Claims. (Cl. 25—38)

1

This invention relates to an apparatus for applying and for smoothing or troweling coating compositions. More particularly this invention is directed to an apparatus for coating or lining the interior surface of conduits as well as novel methods and apparatus for smoothing or troweling coating compositions after their deposition on to the interior surface of conduits. This application is a continuation in part of my co-pending application Ser. No. 727,131.

Another object of this invention is to provide novel mechanism for smoothing or troweling a coating composition applied on to the interior surface of a conduit.

Another object of this invention is to provide fluid actuated mechanism for smoothing or troweling a coating composition applied to the inner surface of a conduit.

These as well as other objects and advantages of this invention will be apparent from the following description and drawings, wherein;

Figs. 1 and 2 taken together represent a view partly in section and partly in side elevation of the novel apparatus embodying the invention and show the same being employed in the coating of the interior of a conduit.

Fig. 3 is a view taken on line III—III of Fig. 2.

Fig. 6 is a view taken on line VI—VI of Fig. 8 in the direction of the arrows.

Fig. 7 is a view taken on line VII—VII of Fig. 6 in the direction of the arrows.

Fig. 8 is a view taken on line VIII—VIII of Fig. 6 in the direction of the arrows.

Fig. 9 is a view taken on line IX—IX of Fig. 1 in the direction of the arrows.

Fig. 10 is a view taken on line X—X of Fig. 1 in the direction of the arrows.

Fig. 11 is an enlarged fragmentary view of the rear portion of Fig. 2 which is in section and shows the air passageways.

Fig. 12 is a view taken on line XII—XII of Fig. 11.

Figure 4:
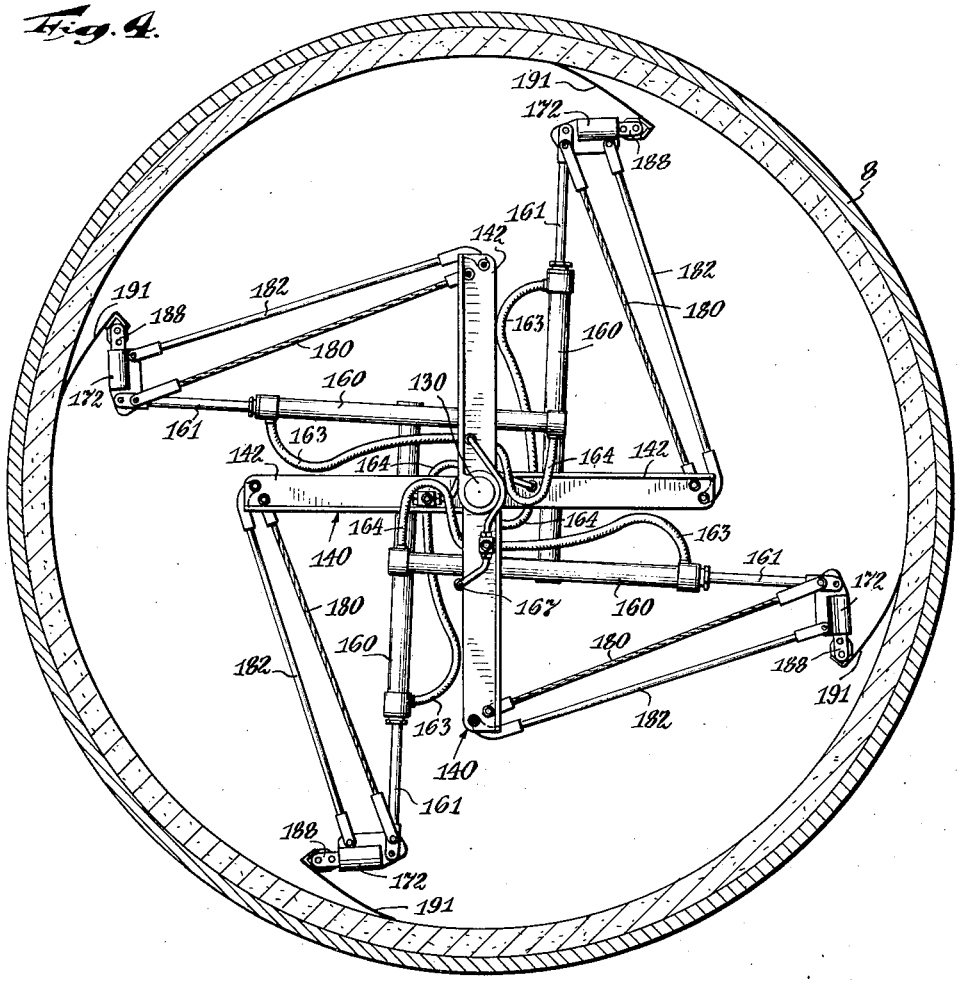
Fig. 4 is an end view taken on line IV—IV of Fig. 1 to show the troweling mechanism, with the coating being enlarged.
Figure 5:
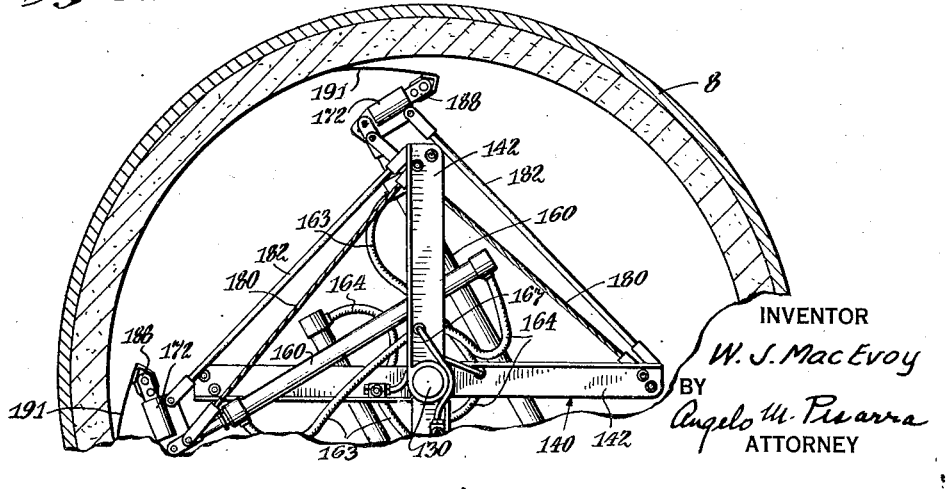
Fig. 5 is a fragmentary view of the troweling mechanism as shown in Fig. 4 but with the parts of the troweling mechanism disposed at a different relationship with respect to each other, and with the coating enlarged. This view shows the particular relationship of parts when the troweling mechanism is disposed in a conduit whose diameter is less than that shown in Fig. 4.

As shown in the drawings 8 represents a section of a conduit through which the novel apparatus while in operation travels in the direction of the arrow 9 for coating the interior surface thereof with a cementitious or plastic material. The apparatus includes a movable or travel carriage 10 made up essentially of structural steel elements and comprises a horizontal frame having a plurality of vertically disposed supports secured thereto. A vertical support 11 of the carriage 10 is a plate secured to one end of the horizontal frame thereof and has a plurality of transverse openings therethrough near each of the side edges thereof. A swiveled wheel 12 is carried by a bracket 13 secured to the support 11 at the lower portion thereof. Horizontally disposed and mounted on the horizontal frame of the carriage 10 is a drive 14 which may be of either the constant speed or of the variable speed type and may be an electric motor having a drive shaft 15. A variable speed reducing mechanism 16 is also supported by the horizontal frame of the carriage 10. A chain 17 extends around a sprocket keyed to the drive shaft 15 and a sprocket keyed to input shaft 18 of the variable speed reducing mechanism 16. Also mounted on the horizontal frame of the carriage 10 is a constant speed reducing mechanism 19 having an input shaft 20. A chain 21 extends around a sprocket keyed to the input shaft 20 of the speed reducer 19 and a sprocket keyed to output shaft 22 of the variable speed reducing mechanism 16. A pair of sprockets 23 and 24 are keyed to output shaft 25 of the speed reducing mechanism 19.

A vertically adjustable plate 26 is demountably secured to supporting members 27 of the carriage 10 extending upwardly from the horizontal frame thereof. Mounted on the plate 26 are a pair of bearings 28 and a clutch mechanism 29. Journaled in the bearing 28 is a short shaft 30 and one end of a shaft 31, both of these shafts 30 and 31 being connected to the clutching mechanism 29 and the entire assembly being carried as a unit by the plate 26. A control handle 32 is also carried by plate 26 and is connected to the clutch mechanism 29 for rendering the clutch in operative or neutral condition, whereupon the shaft 31 may be driven by the shaft 30 or the shaft 31 may be stationary while the shaft 30 is rotating. A chain 33 extends around the sprocket 23, a sprocket 34 keyed to the shaft 30 and an idler sprocket 35 supported by one of the supports 27.

The shaft 31 has a worm drive 36 keyed thereto at the other end thereof and this end of the shaft 31 is journaled in a vertically adjustable casing 37 demountably mounted on vertical supports 38 of the carriage 10 extending upwardly from the horizontal frame thereof. Also carried by the casing 37 is a gear 40 driven by the worm 36 to drive shaft 41 keyed to gear 40 and journaled in bearings carried by the casing 37. A housing 45 is disposed adjacent housing or casing 37, is supported by shaft 41 extending therethrough and may rock on shaft 41. Keyed to the shaft 41 and located in housing 45 is a gear 46 engaging a pair of idler gears 48 supported by casing 45 and which in turn engage a pair of gears 49 keyed to spaced transverse shafts 50 which are also supported by the casing 45. Keyed to each end of the shafts 50 is a drive wheel 51 to provide a pair of drive wheels 51 located on each side of the carriage 10. The casing 45 together with the parts supported and carried thereby form a unitary assembly pivotally mounted on the shaft 41 and is freely rockable thereabout as a pivot. To vary the vertical location of the drive wheels 51 so they may be properly accommodated in conduits of different diameters, the casing 37 may be adjusted vertically on the supports 38, both casing 37 and supports 38 having openings therein through which extend tie-bolts to maintain the casing at any desired location. Any change in the vertical location of the casing 37 which carries with it, the elements supported thereby as well as the assembly including casing 45, requires a corresponding vertical adjustment of the supporting plate 26 carrying the clutch mechanism 29, as well as one end of the shaft 31 and also the shaft 30. Change in the vertical location of the plate 26 and parts carried thereby requires either a change in the length of the chain 33 by the addition or removal of chain links or a change in the size of sprocket 35.

Located above the motor 14, extending longitudinally of the horizontal frame of the carriage 10 and being approximately parallel thereto is an elongated open ended hollow cylindrical member 55. The coating composition receiving and supporting member 55 near one end thereof has a plurality of depending legs 56 with transverse openings therein. Tie bolts extend through the openings in legs 56 and transverse openings in the vertical supports 38 of carriage 10 to maintain one end of the member 55 in position. Secured to the other end of the member 55 is a plate 57 depending therefrom and demountably connected to a vertical support 58 of the horizontal frame of carriage 10. Thus, the vertical location of the receiving and supporting element 55 and the parts carried thereby may be varied with respect to horizontal frame of carriage 10. One end of the member 55 is cut away to provide a receiving opening communicating with the opening in a hopper 60 secured thereto and extending upwardly therefrom. If desired an eccentrically movable vibrator or stirrer (not shown) may be located in the hopper 60 and driven by an independent motor mounted on member 55 to agitate the coating material therein thereby preventing plugging and assuring continuous feed of the coating material to feed screw 61. Centrally located in said member 55 is an elongated tubular rotatable shaft 62 extending through and beyond the ends of member 55. The shaft 62 has a helical feed screw 61 integral or in some other way secured thereto. Centrally located in said tubular shaft 62 and extending beyond the ends thereof is a rotatable tubular shaft 63 whose outside diameter is materially less than the inside diameter of shaft 62 to provide a rotatable fluid, such as air or the like, passageway 64 between shafts 62 and 63. Located in shaft 63 and secured thereto at each end thereof is an air pipe 65 whose outside diameter is materially less than the inside diameter of shaft 63 to provide a rotatable fluid, such as air or the like, passageway 66 therebetween.

One end of the shaft 62 is rotatably supported on a bearing 67 demountably connected to the depending support 57. Located adjacent said bearing 67 and keyed to the shaft 62 is a sprocket 68. A stationary air box 70 is located adjacent sprocket 68 and is supported by the shafts 62 and 63. The shaft 62 terminates adjacent a shoulder of the shaft 63 thereby providing an annular space 71 communicating with the passageway 64. The stationary air box 70 is in the nature of a collar having an annular chamber 72 communicating with an annular slot 73 which in turn communicates with the annular space 71. Packings or piston rings 74 are provided to assure air tight sealing between the stationary air box 70 and shafts 62 and 63. The box 70 has an opening therein accommodating a hose 75 connected to a source of air under pressure through a control valve. Extending from the air box 70 is a supporting skirt 76.

Located adjacent the air box 70 and keyed to the shaft 63 is a gear 78. The shaft 63 has radial slots 80 and 81 therein and spaced from each other and communicating with passageways 65 and 66 respectively. An air distributor head 82 is keyed to shaft 63 as shown in Fig. 12 and has radial slots, the outer communicating at all times with slots 80 and 81 and annular passageways 84 and 85 respectively therein. One end of the air pipe 65 is secured to the shaft 63 at that end thereof to which said member 82 is secured. Mounted on the end of said shaft 63 is a stationary head 86 and bearing which together with the distributor 82 and end cover 87 provide a stationary air box having an opening 88 at which is connected an air hose 89 connected to a source of air under pressure through a control valve and communicating with the annular passageway 85 which in turn communicates with the slot 81 which communicates with the air passageway 66. This air box has another opening 90 therein at which is connected an air hose 91 connected through a control valve to a source of air under pressure and communicating with the other annular passageway 84, in turn communicating with the slot 80 communicating with air pipe 65. Like the other air box, this air box is sealed against air leakage by packings or piston rings 92. The air box has a depending plate 94 secured thereto and demountably connected to the plate 11.

A chain 100 extends around sprocket 24, sprocket 68, an idler sprocket 101, a sprocket 102 keyed to a countershaft 103 journaled in a bearing supported by plates 76 and 94. Keyed to the shaft 103 is a gear 105 meshing with a gear 106 keyed to a shaft 107 supported by plates 76 and 94 and the gear 106 meshes with gear 78. Through this mechanical arrangement the motor drive is imparted to the sprocket 68 and gear 78 to drive simultaneously the shafts 62 and 63 at different speeds.

The other end of the member 55 has a cylindrical inner liner 110 disposed in a recess therein and may be composed of metal, rubber, leather or any other desired material. Mounted at the discharge end of said stationary member 55 is a band or collar 112 which is a bearing having a pair of retainer rings 113 extending around member 55 and located in recesses of said collar. Located forwardly of the member 55 is a wearing ring 115 secured to member 55. Located adjacent wearing ring 115 is a rotatable coating material receiving and discharge head 117 having a plurality of separate compartments with inlet openings or throats communicating with the member 55 through the wearing ring 115. The head 117 has a flange 118 integral therewith and through which extend tie-bolts 119 coupling said head to the collar 112. The head 117 has a plurality of radially disposed discharge outlets 129, each of which communicates with an individual compartment in head 117 and to which may be connected nozzle 121 consisting essentially of cylindrical members shaped at their free ends in the form of a cone. The shafts 62 and 63 extend through head 117. One end of the shaft 62 is interiorly enlarged by securing a bushing thereto to rest on the shaft 63 thereat and a packing or ring 120 is provided to prevent the leakage of air between the end of shaft 62 and the shaft 63. A collar 122 is fixedly or demountably connected to the end of shaft 62 outside of head 117. The connecting collar 122 has a connecting flange 124 secured to the head 117 by bolts 123. Short air discharge pipes 125 are radially mounted in the shaft 62, and communicate with the air passageway 64. Each air discharge pipe 125 is capped at its free end. The cap end of each pipe 125 has narrow air slots 126 crossed with respect to each other and communicating with the interior thereof. The longitudinal center line of each air discharge pipe 125 is coincident with the longitudinal center line of outlet 129 and the nozzle 121 associated therewith. The height of the air discharge pipe 125 is about one half of the radius of each inlet throat of the head 117. A plurality of, and preferably 3–20 narrow air outlet openings 123 may extend from the inner surface of shaft 62 to each compartment. The openings 123 are disposed axially and around the outlet 129 so that air under pressure therethrough will pass through the nozzle 121.

A shaft 130 has a plurality of recesses therein providing air passageways 127 and 128 communicating with openings in the shaft 130 in which are secured air pipes. The shaft 130 also has a locating pin 134 projecting outwardly therefrom (see Fig. 9), with a gasket 131 having corresponding openings therethrough and located between the recessed end of shaft 130 and the end of shaft 63, is demountably connected to the end of shaft 63 by a clamping collar 135 having handles 136 extending outwardly therefrom. As shown in Fig. 1 with the clamp 135 in locking position, the passageways 127 and 128 communicate with the air passageways 66 and 65, with the end of the pipe 65 maintained in position by a short cylindrical member having an opening therethrough accommodating one end of pipe 65 and an opening communicating with the air passageway 66 and the passageway 127.

Demountably mounted on the demountable shaft 130 are a pair of supports 140 spaced from each other along the length thereof with one being in horizontal position when the other is in vertical position. Each support 140 comprises a central hub through which extends the shaft 130 and is demountably connected thereto by stud bolts or the like. The hub has two pairs of radially disposed arms 142 extending outwardly therefrom and being in approximately the same plane. Each of the arms 142 is in the form of an angle iron and has bearings 143 in which are mounted a hollow cylinder 144 having a center plug 145 therein to provide separate air passageways 146 and 147 respectively communicating with openings 148 and 149 in said cylinder, which openings are 180° apart. Mounted on that part of the cylinder 144 located between the bearings 143 is a part 152 of a connector support 153 through which the cylinder 144 extends and is connected thereto by a pin or bolt 155. The connector support 153 also has a pair of arms 154 secured to the part 152 and a take-up nut and bolt extends through the ends of the arms 154 for clamping and unclamping. A cylinder 160 extends through the connecting support 153 and may be firmly held thereto by tightening the nut and bolt arrangement. By clamping and unclamping the connector 153 the position of the cylinder 160 may be adjusted or varied at will and fixed at any desired location so it may be accommodated in conduits of different diameters. The closed cylinder 160 has a fluid actuable piston 162 therein and a piston rod 161 extends from said piston 162 and outside of the cylinder. The cylinder has an opening therein near each end thereof communicating with the interior thereof and located above and below the normal path of travel of the piston. A flexible hose 163 has one end connected to said cylinder 160 through the opening at the outer end thereof and its other end is connected to an opening in the part 152 which communicates with the air passageway 146 through opening 148; and a flexible hose 164 has one end connected to said cylinder 160 through the opening at the inner end thereof and its other end is connected to an opening in the part 152 which communicates with the air passageway 147 through opening 149. A piping 165 has one end supported by the shaft 130 and communicates with the air passageway 127 and is connected to each of the passages 146 in each of the four cylinders 144; and the piping 167 also has one end supported by the shaft 130 and communicates with the air passageway 128 and is connected to each of the passageways 147 in each of the four cylinders 144.

The outer end of the piston rod 161 has a pair of ears 170 secured thereto by pin 171. A trowel head or support 172 has a side ear 173 and an elongated ear 174. The ear 173 is located between the ears 170 and has an arcuate guide opening 176 therethrough. A pin 177 is secured to ears 170 and passes through an opening in the ear 173 and said head may rock or pivot about said pin 177. A pin 175 is also secured to said ears 170 and is located in slot 176 to limit the degree of rocking or pivoting. A tie rod or cable 180 has one end swingably connected to said pin 177 and its other end swingably connected to a pin 181 secured to support 140. A tie or stay rod 182 has one end swingably connected to a pin 183 carried at the forward end of ear 174 and its other end swingably connected to a pin 187 and carried by support 140. The head 172 has a cylindrical recess 185 therein accommodating a solid cylinder support 186 located therein and having a pair of outwardly extending ears 188. Between ears 188 is located an ear 189 terminating at its front end in the form of an angular support 190. Secured to one face of support 190 is trowel 191 comprising a sheet of resilient metal capable of being deflected in form. A lock bolt 192 extends through the ears 188 and through an opening in the ear 189. The ear 189 has an arcuate slot 195 therein through which passes a lock bolt 196 secured to ears 188 so that the angle of the trowel may be adjustably locked by lock bolt 192 and 196. The support cylinder 186 has a pair of incline slots 197. A pin 198 extends through head 172 and cooperates with slots 197 to limit the rocking of head 186 about 15° either way as shown in Fig. 7.

One of the novel methods which may be employed with the hereinbefore described apparatus for coating the interior surface of conduits will now be described. A wide variety of coating compositions may be employed. An especially useful class of such materials are the well known cementitious coating compositions, a common example of which is concrete, usually consisting of cement, sand and water. One of the more preferable classes of said cementitious coating composition is a mixture of concrete and asbestos, with the asbestos being in elongated fiber or comminuted powdered form. In most cases the pre-mix of this type of coating composition which is loaded into the receiver support 55 through the hopper 60 may comprise essentially 3-5 lbs. of asbestos, 94 lbs. of cement, 1.25-1.75 cubic ft. of sand and the required amount of water to produce a mix of the desired consistency. The consistency of the pre-mix is preferably such that it will not flow, but may be trowelled or smoothed after deposition on the inner side wall of the conduit 8. The cementitious coating composition of asbestos and concrete has a number of advantages over pre-mixed concrete in which the asbestos is absent. The presence of asbestos in this concrete mix imparts to said mix the following advantages: (1) It acts as a lubricant in feeding the mix through the receiver support 55 to the separate compartments of the head 117, thus, making it easier to feed and extrude the mix to the discharge nozzles 129. (2) It renders the mix easier to trowel so that a smoother outer face may be obtained by the action of trowels 191 thereon. (3) It renders the mix more "gummy" so that rebound is reduced. (4) It absorbs excess moisture which aids in troweling and acts as a reservoir to feed the moisture back to the cement during curing.

After properly adjusting the apparatus in the manner heretofore set forth and locating it in the conduit 8 in the manner shown in Figs. 1 and 2, the plastic or cementitious composition such as the asbestos containing pre-mixed concrete of the desired consistency is poured through the inlet mouth of the hopper 60 after the motor 14 has been energized. Energization of the motor simultaneously drives the apparatus as a unit along the length of the conduit 8 in the direction of the arrow 9, feeds the coating material along the receiver support 55 to the compartments of the receiving and discharge head 117, drives the head 117 and also the troweling mechanism. The energization of motor 14 drives the shaft 15 which through the various mechanical connections drives the wheels 51 and the shaft 62 and 63 as well as the support 130 of the troweling mechanism. The rotating shaft 62 imparts motion to the feed screw 61 which feeds the coating material along the receiver support 55 and extrudes it into the receiving throats of head 117. The rotating shaft 62 also imparts motion to the head 117 which like the feed screw 61 is rotated at the same speed as the shaft 62. The rotating shaft 63 imparts motion to the troweling mechanism through rotation of the support 130 thereby.

Air is admitted under pressure to the hose 75, then passes through the stationary air inlet box 70 in and through the rotating passageway 64 through the rotating air outlets 125 and through the narrow openings 123. As the air under pressure (preferably 25-50 pounds per square inch) passes out of the slots 126 at the capped end of each outlet 125 it is in the form of a pressure air stream flowing through outlets 129 and nozzles 121 of the head 117. As the coating material is continuously fed to the separate compartments of the rotating head 117, it is moved in the path of each rotating air stream from the openings 123 and then in the path of rotating air streams from nozzles 125 and is acted upon substantially solely by these air streams to be moved from the intake throats of the head 117 through the outlet 129 and nozzle 121 and deposited in finely divided particles onto the interior surface of the conduit 8. In most cases it is preferred that the speed of rotation of the shaft 62 and therefore that of the screw 61 and head 117 be relatively low and generally between 10-80 R. P. M. and preferably 10-45 R. P. M.

While the shaft 62 is being constantly rotated at a substantially uniform speed, shaft 63 is also being constantly rotated at uniform speed which differs from the speed of rotation of the shaft 62. Rotation of the shaft 63 drives the support 130 coupled therewith to rotate the supports 140 together with the troweling mechanism carried thereby whereby the trowels 191 are rotated at a constant speed about the longitudinal center line of the support 130 as an axis. The pressure of the smoothing face of the trowels 191 against the coating material is maintained and controlled by the pressure of fluid supplied to the cylinder 160. The fluid under pressure may be admitted through the hose 91 connected to stationary plate 87 through the passageways 90, 84, 80, 65, 128, 167, 147 and 164 to an inlet at one end of the cylinder 160 to force the piston rod 161 outwardly. While any desirable fluid may be employed and may be either a liquid or a gas, I prefer that the fluid admitted to cylinder 160 be of a compressible nature and therefore a gas much as air or the like. By varying at will the pressure of the fluid admitted to the cylinders 160 through the passageways 64, it is possible to vary and easily control the pressure of the trowels 191 on the coating material in the troweling operation. Besides serving this purpose, the fluid under pressure admitted to the cylinders 160 through the passageways 164 may be employed to move the trowels 191 to operative position. When it is desired to retract the trowels 191 to inoperative position the fluid pressure through the passageway 164 is relieved and then fluid under pressure is admitted through the air hose 89 connected to the stationary air inlet box 86 and communicates with the air passageway 66 which in turn communicates with passageway 127, 165, 146, 163 and the other end of the cylinder 160. The air inlet hose 89 carried by the stationary box 86, as well as the air inlet hose 91 may be appropriately connected to a multi-valve-fluid-way which in turn is connected to a source of fluid supply under pressure so that upon actuation of the valve, pressure in one hose is relieved while supplied to the other.

In operation, while the fluid pressure against the piston is maintained at any desired value, depending on the consistency of the coating material, and when the conduit is out of round, the piston rod 161 moves back and forth automatically and in this movement, the cylinder 160 pivots about 145 due to the extension or retraction of rod 161 and because of the action of cable 180. Upon swinging or pivoting motion of cylinder 160, the rod 182 in turn swings whereby the angle of contact of trowel 191 is maintained constant.

In one of the embodiments of the invention, the pressure of trowels 191 disposed at the further end of shaft 130 is less than the pressure of trowels 191 located closer to the member 55 whereby the first set of trowels serve as finishing trowels and the others serve as roughing trowels. For this purpose the pistons 162 carrying said roughing trowels are of greater diameter and preferably twice that of the piston for the finishing trowels so that the pressure of the roughing trowels on the coating is about twice that of the finishing trowels on the coating.

I claim:

1. Apparatus for troweling a coating on the interior surface of a conduit comprising a rotatable support, fluid actuable means pivotally supported by said rotatable support, and a trowel, said fluid actuable means operatively connected to said trowel.

2. Apparatus for troweling a coating on the interior surface of a conduit comprising a rotatable support, a fluid chamber pivotally carried by said support, a fluid actuable piston in said chamber, a trowel, said piston being operatively connected to said trowel.

3. Apparatus for troweling a coating on the interior surface of a conduit comprising a rotatable support, a fluid chamber adjustably and pivotally carried by said support, a fluid actuable piston in said chamber, a trowel, said piston being operatively connected to said trowel.

4. Apparatus for troweling a coating on the interior surface of a conduit comprising a rotatable support, a fluid chamber pivotally carried by said support, a fluid actuable piston in said chamber, a trowel, a trowel support, said trowel carried by said trowel support, a piston rod connected to said piston and to said trowel support and a rod pivotally connected to said rotatable support and to said trowel support.

5. Apparatus for troweling a coating on the interior surface of a conduit comprising a rotatable support, a fluid chamber pivotally carried by said support, a fluid actuable piston in said chamber, a trowel, said piston being operatively connected to said trowel, a rotatable fluid passageway communicating with said chamber for the passage of fluid under pressure therethrough to said chamber.

6. Apparatus for troweling a coating on the interior surface of a conduit comprising a rotatable support, a fluid chamber pivotally carried by said support, a fluid actuable piston in said chamber, a trowel, said piston being operatively connected to said trowel, a rotatable fluid passageway communicating with said chamber for the passage of fluid under pressure therethrough to said chamber and means for controlling the pressure of said fluid on said piston.

7. Apparatus for troweling a coating on the interior surface of a conduit comprising a rotatable support, a fluid chamber pivotally carried by said support, a fluid actuable piston in said chamber, a trowel, said piston being operatively connected to said trowel, rotatable fluid passageways communicating with said chamber for the passage of fluid into said chamber at different sides of said piston.

8. Apparatus for troweling a coating on the interior surface of a conduit comprising a rotatable member, an approximately radially disposed support secured to said member, fluid actuable means pivotally carried by said support, a trowel, said fluid actuable means operatively connected to said trowel, and a movable carriage for carrying said rotatable member, said carriage being operatively connected to said member.

9. Apparatus for coating the interior surface of a conduit comprising a receiver and support for a coating composition, a pair of rotatable members and a rotatable fluid passageway, a receiving and discharge head operatively connected to one of said members for receiving said composition from said receiver and support, a feed screw operatively connected to said one of said members and driven thereby for feeding said composition from said receiver and support to said head, fluid actuable means operatively connected to said other member and driven thereby, a trowel, said fluid actuable means operatively connected to said trowel and actuated by fluid under pressure supplied thereto through said passageway.

10. Apparatus for coating the interior surface of a conduit comprising a receiver and support for a coating composition, a pair of rotatable members and a rotatable fluid passageway, a receiving and discharge head operatively connected to one of said members for receiving said composition from said receiver and support, a feed screw operatively connected to said one of said members and driven thereby for feeding said composition from said receiver and support to said head, pivoted and rotatable fluid actuable means operatively connected to said other member and driven thereby, a trowel, said fluid actuable means operatively connected to said trowel and actuated by fluid under pressure supplied thereto through said passageway.

11. Apparatus for coating the interior surface of a conduit comprising a receiver and support for a coating composition, a pair of rotatable members and a rotatable fluid passageway, a receiving and discharge head operatively connected to one of said members for receiving said composition from said receiver and support, a feed screw operatively connected to said one of said members and driven thereby for feeding said composition from said receiver and support to said head, a fluid chamber connected to said other member and driven thereby, a fluid actuable piston in said chamber, a trowel, said piston operatively connected to said trowel, said passageway communicating with said chamber for supplying fluid under pressure thereto.

12. Apparatus for coating the interior surface of a conduit comprising a receiver and support for a coating composition, a pair of rotatable members and a rotatable fluid passageway, a receiving and discharge head operatively connected to one of said members for receiving said composition from said receiver and support, a feed screw operatively connected to said one of said members and driven thereby for feeding said composition from said receiver and support to said head, a pivoted fluid chamber connected to said other member and driven thereby, a fluid actuable piston in said chamber, a trowel, said piston operatively connected to said trowel, said passageway communicating with said chamber for supplying fluid under pressure thereto.

13. Apparatus for coating the interior surface of a conduit comprising a receiver and support for a coating composition, a pair of rotatable members in said receiver and support, a rotatable receiving and discharge head for receiving said composition, a feed screw operatively connected to and driven by one of said members for feeding said composition into said head, pivoted and rotatable fluid actuable means operatively connected to the other of said rotatable members and driven thereby, a trowel, said fluid actuable means operatively connected to said trowel.

14. Apparatus for coating the interior surface of a conduit comprising a receiver and support for a coating composition, a pair of shafts in said receiver and support, a rotatable receiving and discharge head operatively connected to one of said shafts and driven thereby, a fluid chamber operatively connected to the other of said shafts and driven thereby, a screw operatively connected to one of said shafts and driven thereby to feed said composition along said receiver and support to said head, a piston in said chamber, a trowel, said piston operatively connected to said trowel, fluid passageway extending along one of said shafts and connected to said chamber for supplying fluid under pressure thereto.

15. Apparatus for coating the interior surface of a conduit comprising a receiver and support for a coating composition, a pair of shafts in said receiver and support, a rotatable receiving and discharge head operatively connected to the outer one of said shafts and driven thereby, a fluid chamber operatively connected to the inner one of said shafts and driven thereby, a feed screw operatively connected to the outer one of said shafts and driven thereby to feed said composition along said receiver and support to said head, a piston in said chamber, a trowel, said piston operatively connected to said trowel, fluid passageway extending along one of said shafts and connected to said chamber for supplying fluid under pressure thereto.

16. Apparatus for troweling a coating on the interior surface of a conduit comprising a rotatable support, a fluid chamber pivotally carried by said support, a fluid actuable piston in said chamber, a trowel, a trowel support, means operatively connecting said trowel support to said piston, said trowel carried by said trowel support and being movable relative to said trowel support in a pair of planes substantially at right angles to each other.

17. Apparatus for troweling a coating on the interior surface of a conduit comprising a rotatable support, a fluid chamber pivotally carried by said support, a fluid actuable piston in said chamber, a trowel, a trowel support, means operatively connecting said trowel support to said piston, said trowel carried by said trowel support and being movable relative to said trowel support in a pair of planes substantially at right angles to each other, and a rod pivotally secured to said rotatable support and to said trowel support.

18. Apparatus for troweling a coating on the interior surface of a conduit comprising a rotatable support, fluid actuable means pivotally supported by said rotatable support, a trowel, said fluid actuable means operatively connected to said trowel, a movable carriage, means for moving said carriage along the length of said conduit, said rotatable support being supported by said carriage and movable therewith, means for supplying fluid under pressure to said fluid actuable means to move said fluid actuable means and said trowel relative to said rotatable support for disposing said trowel in operative and inoperative positions and means for controlling the pressure of said fluid applied to said fluid actuable means when said trowel is in operative position for varying at will the trowelable pressure of said trowel.

WARREN J. MacEVOY.

REFERENCES CITED

The following references are of record in the file of this patent:

UNITED STATES PATENTS

| Number | Name | Date |
| --- | --- | --- |
| 1,932,063 | Brown et al. | Oct. 24, 1933 |
| 1,988,329 | Perkins | Jan. 15, 1935 |
| 2,200,871 | Bosomworth | May 14, 1940 |
| 2,261,928 | Perkins | Nov. 4, 1941 |
| 2,297,163 | Perkins | Sept. 29, 1942 |
| 2,399,321 | Butler | Apr. 30, 1946 |